FIP8502 OR 3,619,673

[redacted] [redacted] [redacted] [11] 3,619,673

[72] Inventor Clifford J. Helms
Calabasas Park, Calif.

[21] Appl. No. 26,330
[22] Filed Apr. 7, 1970
[45] Patented Nov. 9, 1971
[73] Assignee Data Products Corporation
Woodland Hills, Calif.
Continuation-in-part of application Ser. No. 704,291, Feb. 9, 1968, now Patent No. 3,505,599.

[54] MOVING COIL LINEAR MOTOR

5 Claims, 6 Drawing Figs.

[52] U.S. Cl. .......... 310/13, 179/115.5
[51] Int. Cl. .......... H02k 41/02
[50] Field of Search .......... 310/12–14, 27; 179/115.5, 115.5 DV, 1 F, 11 FS; 318/135

[56] References Cited

UNITED STATES PATENTS

| | | | |
|---|---|---|---|
| 2,781,461 | 2/1957 | Booth et al. | 310/27 |
| 3,505,544 | 4/1970 | Helms | 310/13 |

OTHER REFERENCES

IBM Technical Disclosure Bulletin, " Linear Actuator," Smeltzer, Vol. 4, No. 3, August 1961

*Primary Examiner*—D. F. Duggan
*Attorney*—Lindenberg, Freilich & Wasserman

ABSTRACT: A linear motor capable of providing a reasonably long stroke and rapid acceleration. The motor is comprised of a core structure defining an airgap around a central leg. Means are provided for developing a substantially uniform magnetic field through the gap. A substantially rigid drive coil structure is concentrically disposed around the central leg with the turns thereof threading the gap. The coil is mounted for reciprocal movement along the central leg in response to a propelling force developed on the coil by driving a current therethrough. In order to minimize inductance, a bucking coil is also wound around the central leg and connected in series opposition to the movable drive coil.

INVENTOR.
CLIFFORD J. HELMS

BY Lindenberg, Freilich & Wasserman

ATTORNEYS

INVENTOR.
CLIFFORD J. HELMS
BY
Lindenberg, Freilich & Wasserman
ATTORNEYS

MOVING COIL LINEAR MOTOR

CROSS-REFERENCE TO RELATED APPLICATIONS

This application is a continuation-in-part of U.S. Pat. application Ser. No. 704,291, filed on Feb. 9, 1968, now U.S. Pat. No. 3,505,599.

BACKGROUND OF THE INVENTION

1. Field of the Invention

This invention relates to electric motors capable of providing linear movement.

More particularly, the present invention relates to linear motors suitable for use in applications where high speed, accuracy and relatively long strokes are required. One such application is as a linear positioner in a magnetic disc memory. Such memories employ magnetic discs which may have as many as 1200 concentric tracks recorded on a surface having a 12-inch radius. In such memories, a head-carrying arm is provided adjacent each disc surface. The arm may, for example, carry only four heads so that it is necessary to be able to move the arm radially 3 inches with respect to the disc in order to position a head adjacent to a selected track. It will be appreciated that such applications require extremely accurate positioning resolutions. Moreover, inasmuch as the head positioning time constitutes a significant portion of the overall memory access time, it will also be appreciated that rapid positioning is extremely important. A further requirement of a linear positioner for use in a disc memory system is that it have a relatively long stroke, e.g., more than 1 inch, in order to minimize the number of heads required per disc surface.

2. Description of the Prior Art

The prior art discloses many linear positioning devices intended for use in magnetic disc memory systems; e.g., see U.S. Pat. No. 3,135,880, U.S. Pat. No. 3,314,057 and IBM Technical Disclosure Bulletin, Vol. 14, No. 3, Aug. 1961, Smeltzer "Linear Actuator." Although such prior art devices may function adequately in many types of disc memories, they gradually become unsatisfactory as track density requirements increase and positioning time requirements decrease.

SUMMARY OF THE INVENTION

In view of the foregoing, it is an object of the present invention to provide a fast and accurate linear motor capable of providing a reasonably long stroke.

In accordance with the present invention, a motor is provided which includes a magnetic core structure defining an airgap around a central leg. Means are provided for developing a substantially uniform magnetic field through the gap. A movable drive coil is concentrically disposed around the central leg with the turns thereof threading the gap so that a current driven through the coil will develop a propelling force on the coil structure sufficient to move it along the central leg.

In accordance with a significant feature of the invention, in order to minimize the inductance of the drive coil to permit rapid current changes, a bucking coil is also wound around the central leg and connected to the drive coil so as to minimize the flux in the central leg. Another significant feature resulting from the introduction of the bucking coil is the reduction in the net external magnetic field produced by the drive coil.

In order to achieve a uniform thrust characteristic for the entire stroke length, the preferred embodiment of the invention disclosed in the afore-cited parent application Ser. No. 704,291 utilizes a core structure defining an active gap having a longitudinal dimension as long as the sum of the corresponding dimension of the movable drive coil and the desired stroke length. Permanent magnets are arranged so as to assure a substantially uniform magnetic field intensity across the gap along the entire gap longitudinal dimension. Thus, energization of the drive coil at any position along the longitudinal dimension will produce the same thrust. The bucking coil connected in series with the drive coil and arranged to produce an oppositely directed magnetic field in response to a series current therethrough minimizes the drive coil inductance to permit the drive current therethrough to change more rapidly.

In accordance with a preferred embodiment of the present invention, a core structure is employed including a gap having a longitudinal dimension (i.e., dimension extending in the same direction as drive coil reciprocal movement) which may be shorter than the corresponding drive coil dimension. In order to assure a uniform thrust characteristic over the entire stroke length, brushes are provided to energize only that portion of the drive coil which is contained within the gap. That is, regardless of the drive coil position at any particular instant, a fixed number of drive coil turns will be within the gap and it is this fixed number through which the drive current is driven to thus develop thrust on the drive coil which is independent of drive coil position. In accordance with a significant aspect of the preferred embodiment of the present invention, a stationary bucking coil is wound on the central core leg and connected in series with the drive coil. The stationary bucking coil and movable drive coil are oppositely wound to produce oppositely directed magnetic fields in response to a series current therethrough to thus permit more rapid current changes and higher accelerations.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
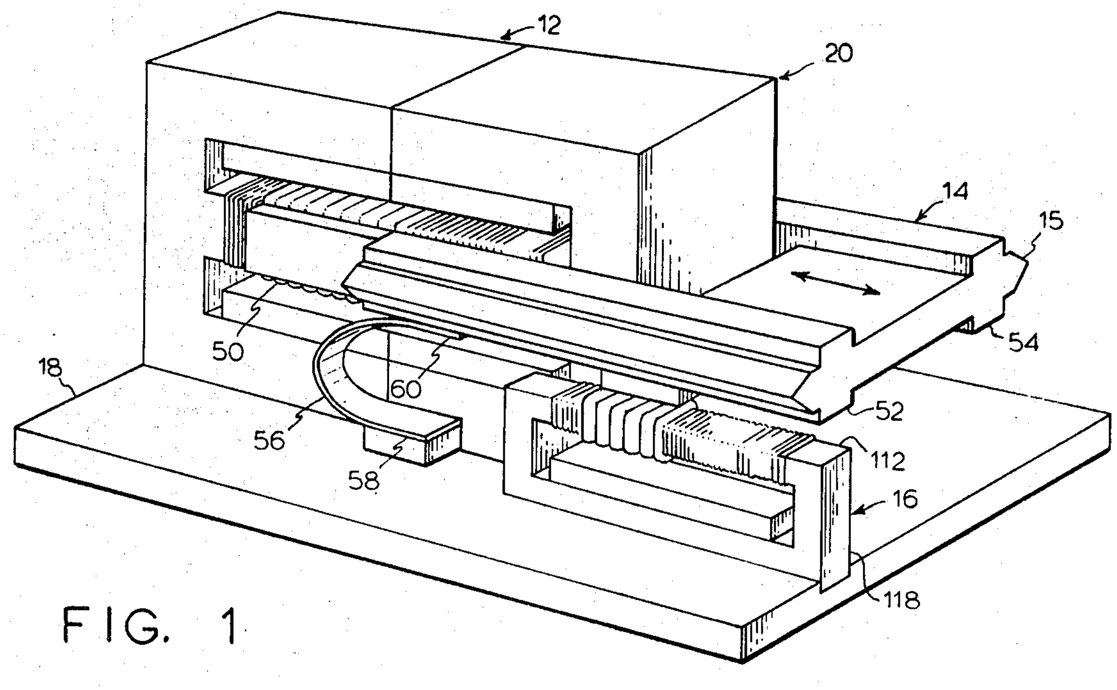
FIG. 1 is a perspective view of a linear positioner for use in a magnetic disc memory system employing a linear motor disclosed in the afore-cited parent application.

Attention is now called to FIG. 1 which illustrates a linear positioner disclosed in the afore-cited parent application. Although the linear positioner of FIG. 1 is intended primarily to be utilized for positioning magnetic heads in a disc memory system, it will be readily recognized that the apparatus is suitable for use in many other applications.

The linear positioner of FIG. 1 includes a linear motor 12 capable of driving a rigid carriage structure 14. The carriage structure can be provided with tracks 15 adapted to ride in mating channels or ball bearings (not shown) to constrain the carriage movement to a linear direction. The linear positioner of FIG. 1 also includes a linear tachometer 16, which operates upon substantially the same principles as does the linear motor 12. The motor 12 and tachometer 16 are supported on a suitable base 18.

Figure 2:
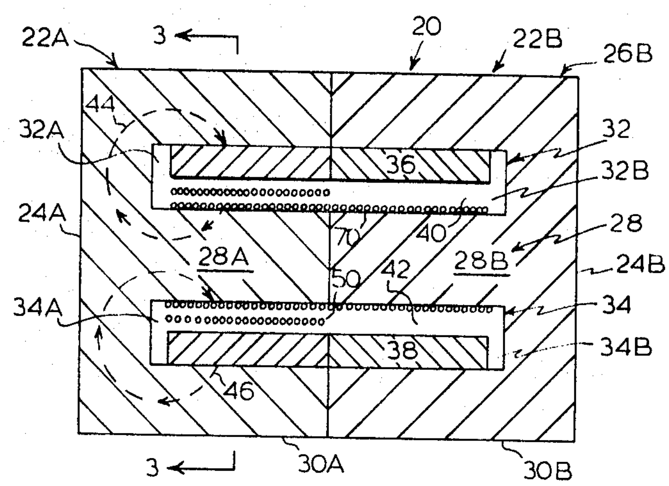
FIG. 2 is a vertical sectional view taken through the linear motor of FIG. 1.
Figure 3:
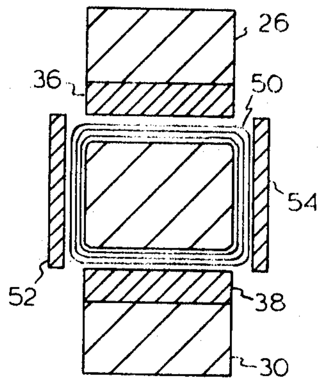
FIG. 3 is a vertical sectional view taken substantially along the plane 3—3 of FIG. 2.

The motor 12 is comprised of a soft iron core structure 20. The core structure 20, as is best shown in FIGS. 2 and 3, may be formed from two oppositely oriented E-shaped portions 22A and 22B. Core structure portion 22A includes a vertical leg 24A, an upper leg 26A, a central leg 28A, and a lower leg 30A. Similarly, core structure portion 22B has a vertical leg 24B, an upper leg 26B, a central leg 28B, and a lower leg 30B. Upper passages 32A and 32B respectively space the upper legs 26A and 26B from the central legs 28A and 28B. Similarly, lower passages 34A and 34B respectively space the lower legs 30A and 30B from the central legs 28A and 28B.

THe core structure portions 22A and 22B are oriented with respect to each other as shown in FIG. 2 with the faces of the free ends of the upper, central and lower legs in intimate contact with each other. Hereinafter, the composite core structure 20 will be referred to as being comprised of an upper leg 26, a central leg 28, and a lower leg 30, and vertical legs 24A and 24B. The upper and lower passages through the composite core structure 20 will be referred to respectively by the numerals 32 and 34.

It will be appreciated that although the core structure 20 has been illustrated in FIGS. 1 and 2 as being comprised of two E-shaped portions, it could in fact be comprised of a lesser or greater number of portions depending upon the manufacturing techniques selected.

Permanent magnets 36 and 38 secured to the legs 26 and 30, respectively, are provided for establishing magnetic fields in the passages 32 and 34 which extend substantially parallel to the vertical legs 24A and 24B. The vertical dimensions (as shown in FIG. 2) of the permanent magnets 36 and 38 are less than the vertical dimensions of the passages 32 and 34 to thereby respectively define gaps 40 and 42. That is, gap 40 is defined between the permanent magnets 36 and the central leg 28, and gap 42 is defined between the permanent magnets 38 and the central leg 28. THe permanent magnets 36 and 38 are oriented so as to create magnetic fields extending either into or out of the central leg 28. The dotted lines 44 and 46 in FIG. 2 represent magnetic flux lines, which originate at the permanent magnets and extend into the central leg 28, and then through the vertical leg 24A to either the upper leg 26 or lower leg 30.

A substantially rigid multiturn drive coil 50 is wound on a coil from 51 concentrically disposed around the central leg 28. The drive coil 50 and form 51 together form a rigid structure which is secured between a pair of carriage side frame members 52 and 54. The carriage side frame members 52 and 54 may be formed of a variety of materials which are of a size and shape enabling them to be light in weight but stiff. The load to be driven may be connected to the carriage 14 opposite the drive coil 50 end. Current is conducted to the movable coils through flexing members 56. Only one of the flexing members is illustrated in FIG. 1. The flexing members 56 leave a first end 58 anchored to but insulated from the base 18. A second end 60 is secured to but insulated from a side frame member of the carriage 14. The characteristics of the flexing members are selected to provide a low-resistance connection to the drive coil and to provide a negligible loading effect on the motion of the carriage.

In order for the drive coil 50 to be movable along the central leg 28, its length, of course, must be shorter than the length or longitudinal dimension of the central leg 28. Thus, as shown in FIGS. 1 and 2, the longitudinal dimension of the coil 50 can be approximately one-half the longitudinal dimension of the central leg 28. Thus, for example, if the longitudinal dimension of the central leg is 4 inches, the coil 50 can have a longitudinal dimension of 2 inches with the difference (2 inches) constituting the stroke length.

In order to physically motivate the drive coil 50 and carriage 14 rigidly coupled thereto an electrical current is driven through the drive coil which interacts with the magnetic field through the gaps 40 and 42 to develop a force on the coil structure which acts parallel to the longitudinal dimension of the central leg 28. The supporting leaf springs 56 are electrically conductive and a source of potential is connected thereacross to drive a current through the drive coil 50. The explanation of the electrical connections between the leaf springs 56, the drive coil 50, and a bucking coil to be introduced will be discussed subsequently in conjunction with the explanation of FIG. 4.

It has previously been pointed out that in order to be useful in the contemplated applications, the motor should be very fast, and have a reasonably long stroke. In order for the motor to be fast, the lateral dimension of the gaps 40 and 42 should be large, since the magnitude of the force developed on the coil structure is substantially proportional to the length of conductor of coil 50 within the gaps. In order to maximize the magnetic field intensity through the gap, the vertical gap dimension should be as small as possible. It should be appreciated that response speed is directly related to the rise time of the leading edge of the drive coil current. That is, if the drive coil current increases to its rated value very quickly, the physical response of the drive coil structure will be very rapid. On the other hand, if the drive coil current rise time is slow, the physical response of the drive coil structure will be correspondingly slow.

In order to enable the rise time of the drive coil current to be very rapid, it is necessary to minimize the drive coil inductance. Unfortunately, this requirement is inconsistent with the motor structure thus far recited because the drive coil will establish flux in the central leg 28, thereby causing the drive coil inductance to be larger than if the central leg were absent. In addition, the flux established by the drive current might saturate some parts of the magnetic path, especially near the ends of the central leg. Another reason for desiring inductance to be minimized is to reduce the net external magnetic field set up by the drive coil.

In order to minimize the drive coil inductance, a bucking coil 70 is wound around the central leg 28. The bucking coil 70 in the embodiment of FIGS. 1–3 is stationary and is essentially concentric with but smaller than the drive coil 50. The bucking coil 70 is connected in series with the drive coil 50 and is wound so as to produce a field in the central leg 28 opposite to that produced by the drive coil 50. Thus, the coil 70 will have the effect of reducing the net flux in leg 28 and therefore the net inductance of the two coils in series will be less than either coil by itself.

Figure 4:
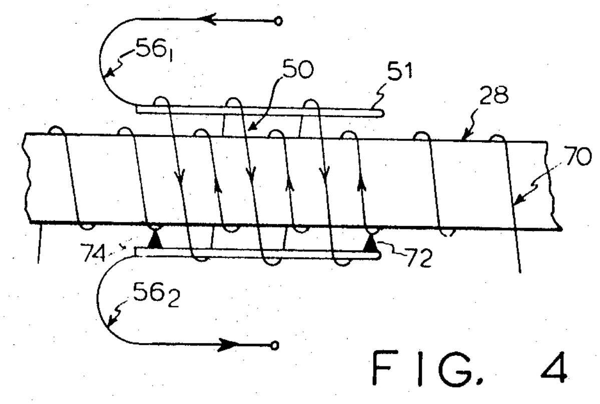
FIG. 4 is a schematic diagram illustrating one form of electrical interconnection between the movable drive coil and stationary bucking coil of the motor of FIGS. 1–3.

The stationary bucking coil 70 may be wound along the entire length of the central leg 28 with the same pitch as that of the movable drive coil 50. As shown in FIG. 4, one end of the movable drive coil 50 can be connected to one of the leaf springs $56_1$. The second end of the drive coil 50 can be connected to a movable contact or brush 72, which is ganged with a second brush 74. The brushes 72 and 74, respectively, contact insulation-free areas of the stationary bucking coil 70. The brush 74 is electrically connected to the second leaf spring $56_2$. A current source is intended to be connected between the free ends of springs $56_1$ and $56_2$ to provide a current through the coils as represented by the arrows.

THe movable brushes 72 and 74 are carried by coil form 51 and are positioned so that for any position of the movable coil 50, a corresponding portion of the stationary bucking coil 70 will be energized. That is to say, the flux in the portion of the central leg 28 surrounded by the movable coil 50 will always be minimized by the combined effect of the coil 50 and that portion of the coil 70 selected by the movable contacts 72 and 74. As a consequence of the coil 50 and active portion of the coil 70 producing opposite effects, the net flux produced by the two coils in the center leg will be very much reduced over what either alone would produce. In fact, the inductance can be made substantially less than the air core inductance of the movable coil.

Figure 5:
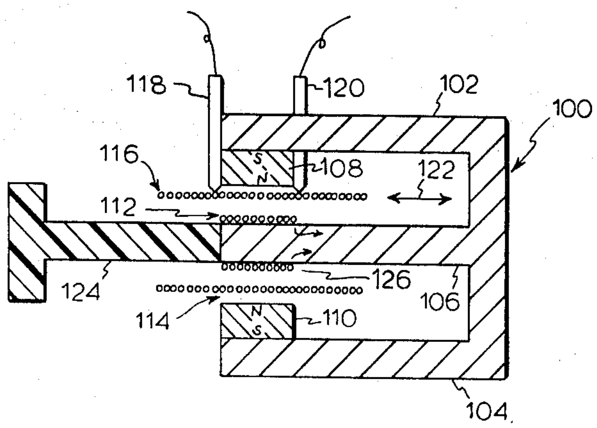
FIG. 5 is a vertical sectional view of a linear motor structure in accordance with the present invention.

Attention is now called to FIG. 5 which illustrates a vertical cross section of an alternative linear motor embodiment in accordance with the present invention. In the embodiment of FIGS. 1–4, in order to achieve a uniform thrust characteristic for the entire stroke length, a core structure was provided defining a gap having a longitudinal dimension at least as long as the sum of the corresponding dimension of the drive coil and the desired stroke length. Permanent magnets were arranged with respect to the core structure so as to establish a substantially uniform magnetic field intensity across the gaps, along the entire longitudinal dimension of the gaps. As a consequence, a current through the drive coil would produce the same thrust on the drive coil structure regardless of the particular position that the drive coil structure happened to be at.

In the alternative embodiment of FIG. 5, a core structure is utilized which includes a gap having a longitudinal dimension (i.e., the dimension extending in the same direction as the drive coil structure reciprocal movement) which is shorter than the corresponding drive coil dimension. In the embodiment of FIG. 5, in order to assure a uniform thrust characteristic of the entire stroke length, brushes are provided to energize only that portion of the drive coil which is contained within the gap.

More particularly, the embodiment of FIG. 5 is illustrated as being comprised of a single E-shaped core structure 100 having an upper leg 102, a lower leg 104, and a central leg 106. A pair of permanent magnets 108 and 110 are provided respectively secured to the legs 102 and 104. The magnets 108 and 110 are oriented so as to both either direct flux toward the central leg 106 or away therefrom. As shown by dotted line in FIG. 5, the magnets 108 and 110 are oriented to direct flux across the gaps 112 and 114 into the central leg 106. It is however pointed out that the orientation of both magnets 108 and 110 can be reversed so that the flux is directed in the opposite direction, across the gaps 112 and 114.

For the sake of clarity, the dimensions of the gaps 112 and 114 will be referred to by the same terms as was used in connection with FIG. 2. Thus, a first or lateral gap dimension extends into and out of the plane of the drawing. The second or longitudinal gap dimensions extend parallel to the elongation of central leg 106. The third or vertical gap dimensions extend perpendicular to the elongation of the central leg 106 within the plane of the drawing. Whereas the gap longitudinal dimensions in the embodiment of FIGS. 1–4 were selected so as to be at least as long as the sum of the corresponding dimension of the drive coil and the stroke length, in the embodiment of FIG. 5, the longitudinal dimensions of the gaps are shorter than the corresponding length of the drive coil 116. However, for any position of the drive coil, only a certain portion thereof will conduct current and thus contribute to the generation of a longitudinal thrust. The portion of the drive coil that will be active for any position of the drive coil structure is the portion between brushes 118 and 120.

The drive coil 116 shown in FIG. 5 will form part of a rigid drive coil structure similar to the rigid drive coil structure shown in FIGS. 1–4. It will be mounted, as on leaf springs 56 of FIG. 1, so as to permit longitudinal movement along the central leg 106 as indicated by the arrows 122. In order to support the drive coil structure over the entire stroke length, the central coil leg 106 is preferably extended by a nonmagnetic extension 124.

The brushes 118 and 120 are spaced apart by a distance equal to the longitudinal gap dimensions. By driving current from one brush to another through the portion of the drive coil therebetween, a thrust in the longitudinal direction will be created on the drive coil structure. Since, regardless of the position of the drive coil structure within the stroke length, the same number of drive coil turns will always be contained between the brushes 118 and 120, it will be apparent that the longitudinal thrust produced on the drive coil will be independent of its longitudinal position.

Although a linear motor suitable for certain applications could be constructed in accordance with FIG. 5 utilizing only the drive coil 116, such a device would not be suitable for modern magnetic disc storage system applications because the inductance of the drive coil 116, when used alone, will limit the rate at which the drive coil current can be changed. This in turn will limit the acceleration of the drive coil structure. In accordance with the present invention, in order to enable the linear motor of FIG. 5 to be utilized in rigorous applications where high-speed positioning is required, a stationary bucking coil 126 is provided. The bucking coil 126 is wound around the central core leg 106 threading the gaps 112 and 114. As shown in FIG. 5, the stationary bucking coil 126 is closely wound around the central leg 106 while the movable drive coil 116 is wound around the bucking coil 126 with enough clearance so as to freely slide thereover.

Figure 6:
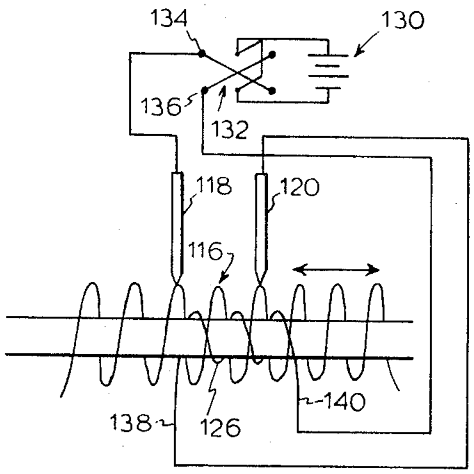
FIG. 6 is a schematic diagram illustrating the electrical interconnection between the drive and bucking coils illustrated in FIG. 5.

In accordance with the present invention, in order to reduce the inductance of the drive coil 116, the active portion of the drive coil 116 is connected in series with the stationary bucking coil with the drive coil and bucking coil being oriented so that a series current therethrough generates oppositely directed magnetic fields in the central leg 106. More particularly, attention is called to FIG. 6 which illustrates the manner of interconnecting the drive coil 116 and bucking coil 126. Initially, assume the existence of a suitable direct current source 130 connected to the blades of a double-pole double-throw switch 132. Assume the blades thrown to the left so that the positive terminal of source 130 connects to terminal 134 and the negative terminal of source 130 connects to terminal 136. Terminal 134 is connected to the first brush 118 which contacts the leftmost (as seen in FIG. 6) turn of the active portion of the drive coil for any position of the drive coil structure. Brush 120 contacts the rightmost turn of the active portion of the drive coil structure and in turn is connected to the left terminal 138 of the bucking coil 126. The right terminal 140 of the bucking coil 126 is in turn connected back to the contact 136. Thus, when the blades of switch 132 are thrown to the left, a direct current will flow from the positive source terminal through the brush 118, through the active portion of the drive coil 116, through the brush 120, through the bucking coil 126 and back to the negative terminal of source 130. The coils 116 and 126 are oppositely wound so as to produce oppositely directed magnetic fields in response to a series current therethrough. As a consequence, the fields will tend to cancel one another thereby reducing the inductance of drive coil 116 thus enabling current changes therethrough to occur much more rapidly than would be possible in the absence of the bucking coil. This in turn assures a greater drive coil acceleration.

What is claimed is:

1. A linear motion device comprising:
a core structure including first and second spaced legs defining a gap therebetween having substantially perpendicular first, second and third dimensions;
means establishing a magnetic field across said gap extending substantially parallel to said gap third dimension and of substantially uniform intensity along said gap second dimension;
a rigid structure supported for reciprocal movement along said first leg parallel to said gap second dimension, said rigid structure including a drive coil comprised of a conductor having portions thereof extending through said gap substantially parallel to said gap first dimension;
a stationary coil comprised of a conductor having portions thereof extending through said gap substantially parallel to said gap first dimension; and
means electrically connecting said drive coil and stationary coil in series, said drive and stationary coils being oppositely oriented so as to develop oppositely directed magnetic fields in response to a series current therethrough.

2. The linear motion device of claim 1 wherein said second gap dimension is smaller than said second drive coil dimension; and
brush means for conducting current through that portion of the drive coil contained within said gap.

3. A linear motion device comprising:
a core structure including a central leg and upper and lower legs spaced therefrom to respectively define upper and lower gaps each having longitudinal, lateral, and vertical dimensions;
a rigid structure supported for reciprocal movement along said central leg parallel to said longitudinal dimension of said gaps, said structure including a drive coil concentrically wound around said central leg and threading said upper and lower gaps, the dimension of said drive coil along said central leg being larger than the longitudinal dimensions of said gaps;
permanent magnet means supported by said core structure establishing magnetic fields across said upper and lower gaps each extending parallel to said gap vertical dimensions with both fields extending either toward or away from said central leg, each of said fields being of substantially uniform intensity along the longitudinal dimension of said gap;

a stationary coil concentrically wound around said central leg and threading said upper and lower gaps; and means electrically connecting said drive coil and stationary coil in series, said drive and stationary coils being oppositely oriented so as to develop oppositely directed magnetic fields in response to a series current therethrough.

4. The linear motion device of claim 3 including first and second brushes respectively contacting turns of said drive coil spaced apart a distance substantially equal to the longitudinal dimension of said gaps for conducting current through the portion of said drive coil therebetween.

5. The linear motion device of claim 4 including a current source having first and second terminals;

means connecting said first terminal to said first brush;

means connecting said second brush to a first end of said stationary coil; and means connecting the second end of said stationary coil to said source second terminal.

* * * * *

Disclaimer 3,619,673.—*Clifford J. Helms*, Calabasas Park, Calif. MOVING COIL LINEAR MOTOR. Patent dated Nov. 9, 1971. Disclaimer filed Mar. 12, 1971, by the assignee, *Data Products Corporation.*

Hereby disclaims the portion of the term of the patent subsequent to Apr. 7, 1987.

[*Official Gazette October 30, 1973.*]